March 27, 1934.   T. C. LEAKE   1,952,174
TRACTION CHAIN FOR TRACTORS
Filed March 30, 1929
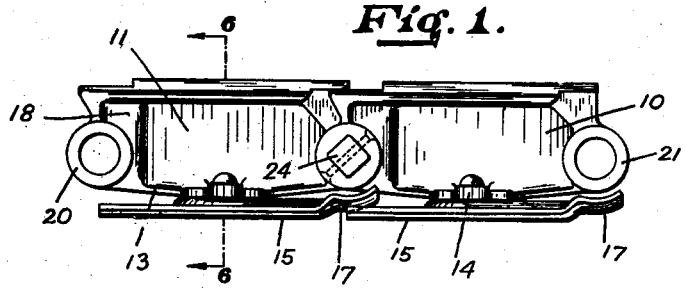
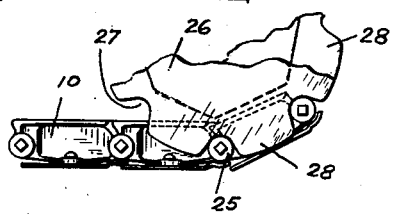
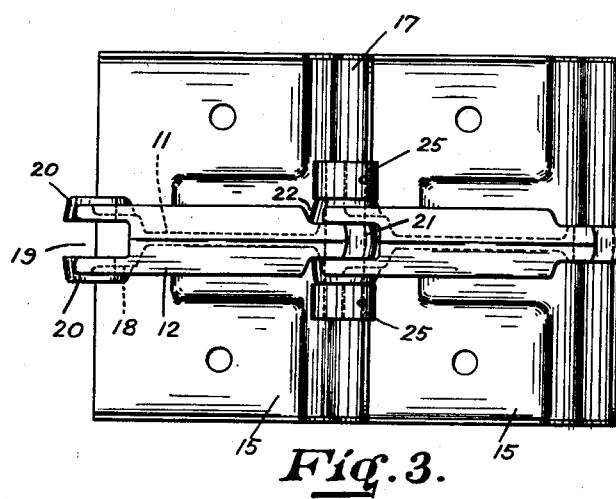
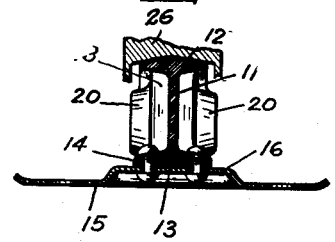
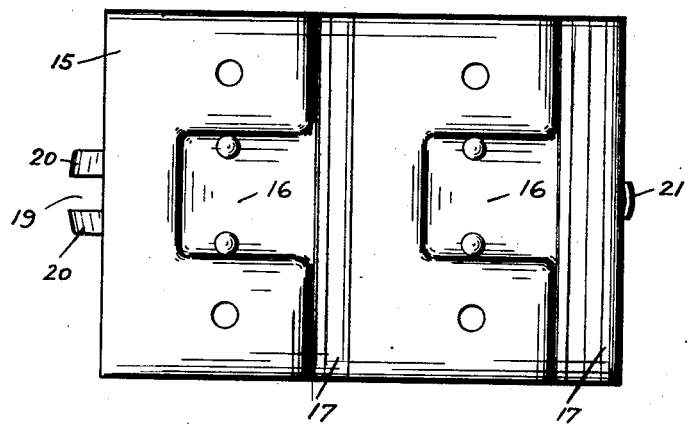
INVENTOR.
Thomas C. Leake
BY
Duell, Dunn & Anderson
ATTORNEYS.

Patented Mar. 27, 1934

1,952,174

UNITED STATES PATENT OFFICE 1,952,174

TRACTION CHAIN FOR TRACTORS

Thomas C. Leake, White Plains, N. Y.

Application March 30, 1929, Serial No. 351,152

3 Claims. (Cl. 305—10)

This invention relates to improvements in traction chains for tractors of the endless chain track laying type, and more particularly, in some of its details, it relates to improvements in the link construction for the chain and to an improved form of articulation between the adjacent links.

It is a general object of the invention to provide an improved construction for track chains of the class mentioned whereby relatively few parts are required, lightness and combined strength are secured and the chain is capable of withstanding the severe shocks and stresses met under actual service conditions, assuring long life, yet the chain is simple in construction and relatively inexpensive in manufacturing costs.

A further and more particular object of the invention is to provide an improved track chain of the class mentioned wherein each link is made up by a single integral piece, thus avoiding a multiplicity of parts and effecting economies in manufacture and in assembly or disassembly.

Another object of the invention is to provide an improved track chain of the class mentioned with an improved flexible connection between the adjacent links which is simple yet strong and provided with an improved wear compensating assembly.

Another object of the invention is to provide in a track chain of the class mentioned an improved wear compensating connection between adjacent links which is constantly automatically adjusted by cooperation with the supporting sprocket so as to equalize wear.

Another object of the invention is to provide in track chains of the class mentioned an improved connection between the adjacent ends of the links embodying novel formations at such ends.

Another object is to provide for track chains of the class mentioned an improved link of unitary construction having a central load carrying element or web with reenforcing elements and symmetrically arranged connecting formations at the ends thereof.

Still another object of the invention is to provide, in track chain construction of the class mentioned, an improved unitary link providing a novel arrangement for supporting and connecting a tread plate.

Other objects will be in part pointed out in the following detailed description of an illustrative but preferred embodiment of the invention and will be in part obvious in connection therewith.

The invention accordingly comprises the features of construction, combinations of elements, and arrangement of parts, which will be exemplified in the construction hereinafter set forth and the scope of the application of which will be indicated in the claims.

For a more complete understanding of the nature and objects of the invention, reference is had to the following detail description and to the accompanying drawing, in which:

Figure 1 is a side elevation of two connected links of a track chain for tractors constructed in accordance with the invention;

Fig. 2 is a plan view thereof;

Fig. 3 is a bottom plan view;

Fig. 4 is a fragmentary side elevation showing the track chain as engaged by a tractor sprocket;

Fig. 5 is a view of one of the connecting pins, and

Fig. 6 is a transverse section taken substantially upon the line 6—6 of Fig. 1.

Referring to the drawing for a detailed description of the illustrative embodiment of the invention there shown, the track chain is made up of a series of links 10 arranged in endwise formation. That is, the links are arranged end to end and the ends of adjacent links are flexibly articulated with each other by means of a connection later described in detail. It will be understood by those familiar with this art that the links may be assembled to form an endless traction chain and also that the chain may be carried by the supporting wheels or sprockets of a tractor. Also, in addition to the sprockets mentioned, the weight of the tractor may be partially transmitted to the track chain through appropriate track rollers cooperating with the chain.

Each link of the improved track chain construction is preferably made of a single, integral piece of metal, such as forged steel. The link is of I-section, as best shown in Fig. 6, having a central web 11 positioned on the longitudinal axis of the link and having an upper flange 12 and a lower flange 13. The upper face of the upper flange is appropriately shaped for engagement with the supporting sprockets or with the rollers of the track roller construction and the lower flange is shaped and appropriately reenforced for the attachment of a tread plate. The upper or external face of the flange 12 is preferably anticlinal in form being inclined downwardly in opposite directions substantially from its longitudinal center line. The upper flange 12 as thus formed is well adapted for a supporting rail, the anticlinal upper surface engaging with the sprocket or with the supporting track roller, thus aiding in maintaining the links in correctly centered position. By means of the construction just described, it will be seen that the tractor weight or load is transmitted through the supporting sprocket and is distributed and equalized on the track chain by means of the supporting rollers 25 and the supporting track rails 12. Not only is the load thus well distributed, but the track lines are stabilized and vibration or "shimmying" under varying conditions of operation are effectually avoided. As shown in Figs. 1 and 6, the lower flange is provided with oppositely disposed lugs or bosses 14. These bosses are formed by integral thickenings or formations at the opposite sides of the flange 13, openings being provided therethrough for rivets extending through registering openings in the tread plate 15, which can thus be firmly attached to and supported by the links.

As shown, the upper oppositely inclined faces of the flange 12 extend substantially from the longitudinal medial line to the flange edges. This construction provides a track roller engaging supporting rail which is simple in structure and capable of economic manufacture yet is especially strong and wear resistant and otherwise well adapted for the accomplishment of the functions of a traction chain link.

There is preferably one tread plate 15 for each link supported in central position upon the latter and each tread plate is formed with an off-set portion 16 displaced from the general plane of the tread plate. This arrangement provides not only a convenient means for attaching the tread plate in position, but it reinforces and strengthens the plate. A grouser of appropriate construction (not shown) may be attached to the lower face of the tread plate.

The adjacent edges of the tread plates overlap, as shown in Fig. 1, one edge being formed with a curved or cylindrical portion 17, with its center of curvature substantially at the center of the link articulation. This tread plate articulation, as shown, is positioned substantially opposite the link articulation and is adapted to maintain a close joint as the links are flexed, while the tractor is traveling.

As clearly seen in Fig. 2, the web 11 divides at one end of the link, forming integral, spaced, web portions 18. A bifurcation is thus formed providing a centrally disposed recess 19. Each of the furcations is provided with an integral thickening forming bosses 20 having aligned, central openings. The upper flange 12 is discontinuous at the recess 19, but the lateral portions thereof may be continuous up to the adjacent end of the link. The lower flange 13 is also discontinuous at the recess 19.

At the opposite end each link 10 is provided with a connecting formation including a centrally disposed boss 21 in longitudinal alignment with the web 11. This connecting boss 21 is formed by means of an integral enlargement or thickening of the web 11 at this point, and is formed, also, with a transverse opening adapted to align with the opening of the connecting bosses 20. At this end of the link the opposite lateral edges of the upper and lower flanges are discontinuous or cut away, as indicated at 22. It will thus be seen that the centrally disposed boss at one end of the link may be received in the recess 19 of an adjacent link, as shown in Fig. 2, with the connecting bosses 20 and 21 in alignment transversely of the links.

In order to connect adjacent links together, a connecting pin 23 is provided at each articulation. As shown in Figs. 1 and 2, this connecting pin extends through the aligned openings in the bosses 20 and 21, having projections or extensions 24 on either side lying beyond the respective bosses 20. These extensions are squared, as shown, or they may be of other cross-sectional shape. To each extension 24 is connected, in any appropriate manner, an enlargement 25 which is preferably in the form of a roller, as shown. These rollers, in the illustrative embodiment, are riveted to the extending ends of the connecting pin 23. It will be observed that the rollers 25 are positioned symmetrically, laterally of the longitudinal axis of the links and they are of sufficient size and strength to act as supports for the chain upon the sprocket of the tractor.

The connecting or body portion of the connecting pin 23 is circular, so that it may turn within the openings of the connecting bosses 20 and 21. The supporting rollers 25 are adapted to cooperate with the tractor sprocket 26 to support the chain and, also, the weight of the tractor is partially transmitted through the sprocket to these rollers. A form of tractor sprocket is diagrammatically shown in Fig. 4, having seats 27 formed in opposing flanges 28 and adapted to receive the rollers. It will be observed that when the rollers engage or disengage in these seats, there will be a tendency to rotate the connecting pins 23 in the connecting bosses 20 and 21. Thus, when the tractor is in operation, there is a tendency, constantly, to shift the position of the pins and thus the wear is effectually equalized. Therefore, the tendency of the pins to become flattened through wear or to become otherwise irregularly or unevenly worn is almost entirely avoided. In this connection it is to be particularly noted that the inner surfaces of the apertures formed in the bosses 20 and 21 provide bearings against which the bearing surfaces of the connecting pin 23 directly engage, the pin bearing directly against the bearing surfaces of the apertures. Also the connecting pin is mounted for free rotation within the link apertures, permitting it to change its angular position very readily and without any obstruction thereto. Furthermore, the pin extensions at opposite sides of the longitudinal axis of the track are fitted with the bearing elements or rollers 25 which are adapted to engage in the seats 27 of the sprocket, thus functioning in cooperation with the sprocket as pin driving elements whereby the rotation of the connecting pin is effected with certainty as these driving elements are moved to and from sprocket engaging positions. Thus, the wear upon the engaging parts of the connections is equalized with a certainty which is of very great importance in prolonging the life of the connection and in assuring its efficiency. Since the supporting rollers 25 are symmetrically spaced with reference to the longitudinal axis of the track chain said chain will be maintained in properly aligned condition. As mentioned, the upper flange 12 of each link may form a track rail for contacting with a track roller, which transmits a portion of the load to the track chain. However, it is clear that the chain link connections and the particular novel arrangement thereof above described for equalizing wear, function and operate quite as advantageously whether or not the sprocket bears upon the track rails 12. It is obvious also that the track roller may bear upon the track rails to support tractor load independently of support thereon of the sprocket. Therefore, it is to be understood that use is contemplated of the connections and arrangement mentioned and other advantageous features, without at the same time utilizing this special bearing cooperation of the sprocket and track rail.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:—

1. In a traction device for tractors, in combination, a traction chain having links positioned in endwise formation and each having a tractor supporting rail, a connecting pin connecting adjacent end parts of adjacent links and rotatably mounted therein, said connecting pin having a plurality of sprocket engaging tractor supporting cylindrical extensions spaced longitudinally of the pin and being symmetrically spaced with reference to the longitudinal axis of the links and at opposite sides of said axis and of said supporting rails, and a tractor supporting sprocket having supporting seats with which said spaced tractor supporting extensions respectively engage in supporting relation, and said tractor supporting rail of each chain link being positioned for tractor supporting cooperation with said sprocket between the respective opposed supporting seats, whereby the tractor is supported upon the chain through said sprocket and through cooperation of the latter both with said supporting rails and with said cylindrical connecting pin extensions.

2. In a traction device for tractors, in combination, a traction chain having chain links positioned in endwise formation, each link having a longitudinal centrally disposed upright web, upper and lower flanges symmetrically positioned with reference to the central web in I-section formation, said upper flange providing a tractor supporting rail, one link having at one end thereof two apertured connecting bosses, and an adjacent link having at its adjacent end an apertured connecting boss positioned between said first mentioned bosses, a connecting pin rotatably engaging in the aligned apertures of said bosses and having a plurality of sprocket engaging enlargements providing tractor supporting rollers spaced apart longitudinally of the pin and symmetrically arranged at opposite sides of the longitudinal axis of the links and at opposite sides of said tractor supporting rails, and a tractor supporting sprocket having supporting seats with which the supporting rollers of the connecting pin respectively engage in tractor supporting relation, said tractor supporting rail of each chain link being positioned for tractor supporting cooperation with said sprocket between the respective opposed supporting seats thereof.

3. In a traction device for tractors, in combination, a traction chain having chain links positioned in endwise formation, each link having a longitudinal centrally disposed upright web, upper and lower flanges symmetrically positioned with reference to the central web in I-section formation, said upper flange providing a tractor supporting rail, one link having at one end thereof two connecting bosses, and an adjacent link having at its adjacent end a connecting boss positioned between said first mentioned bosses, said bosses having apertures the walls of which form bearing surfaces and said apertures of adjacent links being aligned transversely of the chain, a connecting pin extending through said aligned apertures for pivotally connecting the adjacent links and being freely rotatable in the apertures with bearing surfaces thereof in direct bearing contact with the aperture bearing surfaces, said pin having extensions positioned at opposite sides of said connecting bosses and having thereon spaced pin-driving elements positioned at opposite sides of the longitudinal axis of the links, said pin-driving elements being positioned for engagement with a tractor sprocket thereby, through cooperation with the latter, to transmit rotative effort directly to the connecting pin to effect rotation thereof in said aperture bearing surfaces.

THOMAS C. LEAKE.